United States Patent
Morita et al.

(10) Patent No.: US 12,331,693 B2
(45) Date of Patent: Jun. 17, 2025

(54) ENGINE, CONTROL DEVICE, AND CONTROL

(71) Applicant: Yanmar Holdings Co., Ltd., Osaka (JP)

(72) Inventors: Gin Morita, Osaka (JP); Daichi Matsunaga, Osaka (JP); Takafumi Tentora, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/235,127

(22) Filed: Aug. 17, 2023

(65) Prior Publication Data

US 2024/0060454 A1    Feb. 22, 2024

(30) Foreign Application Priority Data

Aug. 19, 2022    (JP) ................ 2022-131114

(51) Int. Cl.
*F02D 19/08*    (2006.01)
*F02D 19/02*    (2006.01)
(Continued)

(52) U.S. Cl.
CPC ......... *F02D 19/081* (2013.01); *F02D 19/024* (2013.01); *F02D 19/0644* (2013.01);
(Continued)

(58) Field of Classification Search
CPC .............. F02D 19/0644; F02D 19/081; F02D 2200/0406; F02D 2200/0414;
(Continued)

(56) References Cited

U.S. PATENT DOCUMENTS

2002/0078918 A1*   6/2002   Ancimer ............... F02B 7/08
                                                                   123/304
2003/0150424 A1*   8/2003   Min ....................... F02P 5/152
                                                                 123/406.55
(Continued)

FOREIGN PATENT DOCUMENTS

CN           114183262 A      3/2022
EP            4206454 A1      12/2022
(Continued)

OTHER PUBLICATIONS

European Search Report dated Jan. 31, 2024 issued in EP Application No. 23189746.3.

*Primary Examiner* — John M Zaleskas
(74) *Attorney, Agent, or Firm* — NORTON ROSE FULBRIGHT US LLP

(57) ABSTRACT

An engine includes a cylinder, a piston, an ignition device, a rotation sensor, an intake temperature sensor, an intake pressure sensor, and a control device. The ignition device ignites a gas mixture. The rotation sensor measures the rotation speed of a crankshaft. The intake temperature sensor measures the temperature of the gas mixture. The intake pressure sensor measures a first pressure value of the gas mixture. The control device controls the hydrogen equivalent ratio of hydrogen contained in the gas mixture and/or timing of igniting the gas mixture based on the rotation speed, the temperature of the gas mixture, and the first pressure value of the gas mixture.

12 Claims, 9 Drawing Sheets

(51) Int. Cl.
*F02D 19/06* (2006.01)
*F02D 19/10* (2006.01)
*F02D 35/02* (2006.01)
*F02D 41/00* (2006.01)
*F02D 41/14* (2006.01)
*F02M 21/02* (2006.01)
*F02P 5/04* (2006.01)

(52) U.S. Cl.
CPC ......... *F02D 35/023* (2013.01); *F02D 35/024* (2013.01); *F02D 35/025* (2013.01); *F02D 35/026* (2013.01); *F02D 41/0027* (2013.01); *F02D 41/1495* (2013.01); *F02M 21/0206* (2013.01); *F02P 5/045* (2013.01); *F02D 19/10* (2013.01); *F02D 41/0007* (2013.01); *F02D 41/0025* (2013.01); *F02D 2200/0406* (2013.01); *F02D 2200/0414* (2013.01); *F02D 2200/0602* (2013.01); *F02D 2200/0606* (2013.01); *F02D 2200/0612* (2013.01); *F02D 2200/101* (2013.01)

(58) Field of Classification Search
CPC ............ F02D 2200/101; F02D 35/024; F02D 35/025; F02D 35/026; F02D 35/027; F02D 41/0007; F02D 41/0025; F02M 21/0206; F02P 5/045; F02P 5/152; F02P 5/1522; F02P 5/1528
See application file for complete search history.

(56) References Cited

U.S. PATENT DOCUMENTS

| | | | | |
|---|---|---|---|---|
| 2004/0118557 | A1* | 6/2004 | Ancimer | F02D 41/403 166/227 |
| 2007/0157912 | A1* | 7/2007 | Ritter | F02D 19/0631 123/526 |
| 2009/0177368 | A1* | 7/2009 | Fattic | F02D 41/3818 701/105 |
| 2010/0077992 | A1* | 4/2010 | Auclair | F02D 35/023 701/111 |
| 2011/0259290 | A1* | 10/2011 | Michikawauchi | F02D 19/0692 123/1 A |
| 2012/0253640 | A1* | 10/2012 | Nada | F02D 41/401 701/103 |
| 2013/0255628 | A1* | 10/2013 | Moren | F02D 19/081 123/406.29 |
| 2014/0034024 | A1* | 2/2014 | Nakajima | F02D 19/0692 123/472 |
| 2014/0238340 | A1* | 8/2014 | Dunn | F02D 19/0642 123/299 |
| 2014/0360444 | A1* | 12/2014 | Morita | F02D 35/025 123/41.08 |
| 2016/0069287 | A1* | 3/2016 | Lavertu | F02D 41/005 701/103 |
| 2016/0153375 | A1* | 6/2016 | Klingbeil | F02D 19/081 123/577 |
| 2016/0169142 | A1* | 6/2016 | Klingbeil | F02D 19/0692 123/435 |
| 2016/0215723 | A1* | 7/2016 | Thomas | F02D 41/0027 |
| 2017/0176280 | A1* | 6/2017 | Joshi | G01M 15/08 |
| 2018/0179995 | A1* | 6/2018 | Ito | F02D 41/3035 |
| 2019/0186394 | A1* | 6/2019 | Sueoka | F02D 13/0261 |
| 2019/0257253 | A1* | 8/2019 | Klingbeil | F02D 19/0642 |
| 2020/0072156 | A1* | 3/2020 | Imai | F02P 5/045 |
| 2020/0200118 | A1* | 6/2020 | Matsuo | F02D 41/04 |
| 2020/0277906 | A1* | 9/2020 | Asai | F02D 19/081 |
| 2021/0301714 | A1* | 9/2021 | Klingbeil | F02M 37/0064 |
| 2021/0404371 | A1* | 12/2021 | Yerace | F02D 41/1497 |
| 2021/0404372 | A1* | 12/2021 | Klingbeil | F02D 41/401 |
| 2022/0034284 | A1* | 2/2022 | Klingbeil | F02D 41/0025 |
| 2022/0163005 | A1* | 5/2022 | Pedder | F02D 35/027 |
| 2022/0235720 | A1* | 7/2022 | Katsuura | F02D 13/0261 |
| 2023/0081493 | A1* | 3/2023 | Lavertu | F02D 41/3094 60/602 |
| 2023/0160350 | A1* | 5/2023 | Klingbeil | F02M 26/43 701/104 |
| 2023/0193841 | A1* | 6/2023 | Lavertu | F02D 31/002 |

FOREIGN PATENT DOCUMENTS

| | | | | |
|---|---|---|---|---|
| JP | H04191464 | A | * | 7/1992 |
| JP | 10252529 | A | * | 9/1998 |
| JP | 2934253 | B2 | * | 8/1999 |
| JP | 2010-071284 | A | | 4/2010 |
| WO | WO-0159280 | A1 | * | 8/2001 ............... F02B 1/12 |
| WO | 2013/118244 | A1 | | 8/2013 |
| WO | WO-2015200443 | A1 | * | 12/2015 ........... F02D 19/081 |

* cited by examiner

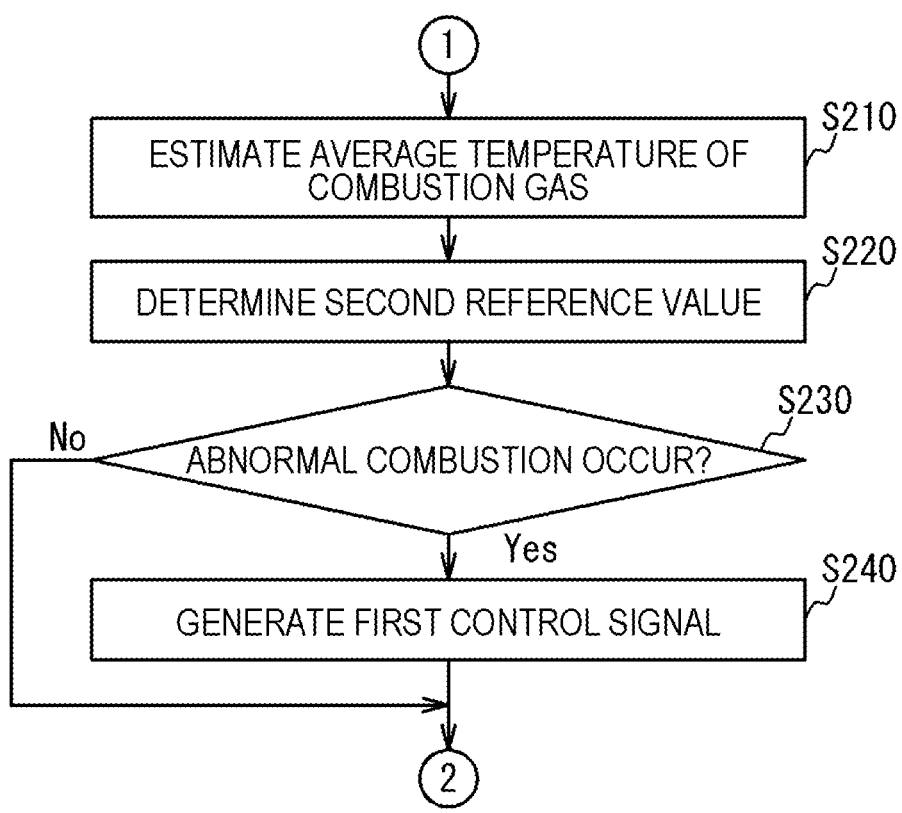

ENGINE, CONTROL DEVICE, AND CONTROL

CROSS-REFERENCE TO RELATED APPLICATIONS

This application claims priority under 35 U.S.C. § 119 to JP Application No. 2022-131114 filed Aug. 19, 2022 the entire contents of which are hereby incorporated by reference.

TECHNICAL FIELD

The present invention relates to an engine, a control device, and a control program.

BACKGROUND ART

In recent years, study has been conducted on a hydrogen engine that obtains power using hydrogen-containing fuel. In the hydrogen engine, hydrogen premixed gas obtained by mixing of hydrogen and air is supplied to a cylinder, and is combusted in the cylinder. In this manner, power is obtained. When the air-fuel ratio of the hydrogen premixed gas is out of a proper range, abnormal combustion, such as pre-ignition in which ignition is made earlier than designed ignition timing, knocking, or backfire, may occur. Since the abnormal combustion might damage the engine, study has been conducted on reduction in the abnormal combustion.

For example, Patent Document 1 discloses a technique of detecting occurrence of abnormal combustion by measuring a pressure in a cylinder of an engine.

For example, Patent Document 2 discloses a technique of controlling an engine to be driven in a state in which the temperature of a cylinder wall surface is in a temperature range in which abnormal combustion is less likely to occur.

PRIOR ART DOCUMENT

Patent Document

Patent Document 1: JP-A-2010-71284
Patent Document 2: WO 2013/118244 A

SUMMARY OF INVENTION

Technical Problem

Since the technique described in Patent Document 1 detects occurrence of the abnormal combustion, it is difficult to reduce occurrence of the abnormal combustion before the abnormal combustion starts. In addition, the technique described in Patent Document 2 drives the engine in the temperature range in which the abnormal combustion is less likely to occur, and does not reduce occurrence of the abnormal combustion before the abnormal combustion starts.

In view of the above-described situation, an object of the present disclosure is to estimate occurrence of abnormal combustion before the abnormal combustion starts. Other objects can be understood from the following description and explanation of embodiments.

Solution to Problem

Hereinafter, means for solving the problem will be described using numbers and reference signs used in embodiments of the invention. These numbers and reference signs are added in parentheses for reference in order to show an example of a correspondence relationship between description in the claims and description in the embodiments of the invention. Thus, the claims shall not be interpreted in a limited manner by the parenthesized description.

An engine (1000) according to an embodiment for accomplishing the above-described object includes a cylinder (110), a piston (120), an ignition device (140), a rotation sensor (170-1), an intake temperature sensor (170-3), an intake pressure sensor (170-2), and a control device (500). The cylinder (110) combusts a gas mixture containing hydrogen inside. The piston (120) reciprocates in the cylinder (110). The ignition device (140) ignites the gas mixture. The rotation sensor (170-1) measures the rotation speed of a crankshaft (130). The intake temperature sensor (170-3) measures the temperature of the gas mixture. The intake pressure sensor (170-2) measures a first pressure value of the gas mixture. The control device (500) controls the hydrogen equivalent ratio of hydrogen contained in the gas mixture and/or timing of igniting the gas mixture based on the rotation speed, the temperature of the gas mixture, and the first pressure value of the gas mixture.

A control device (500) according to an embodiment for accomplishing the above-described object includes an abnormal combustion estimation unit (550) and a control unit (560). The abnormal combustion estimation unit (550) estimates abnormal combustion in a cylinder (110) included in an engine (1000) based on the compression pressure of gas in the cylinder (110), the compression temperature of gas in the cylinder (110), the hydrogen equivalent ratio of gas in the cylinder (110), and the rotation speed of the engine (1000). When the abnormal combustion is estimated, the control unit (560) generates a first control signal for controlling the hydrogen equivalent ratio and/or timing of igniting gas in the cylinder (110).

A control program (600) according to an embodiment for accomplishing the above-described object causes an arithmetic device (520) to execute estimating abnormal combustion in a cylinder (110) included in an engine (1000) based on the compression pressure of gas in the cylinder (110), the compression temperature of gas in the cylinder (110), the hydrogen equivalent ratio of gas in the cylinder (110), and the rotation speed of the engine (1000). When the abnormal combustion is estimated, the control program (600) causes the arithmetic device (520) to execute generating a first control signal for controlling the hydrogen equivalent ratio and/or timing of igniting gas in the cylinder (110).

Advantageous Effects of Invention

According to the above-described embodiments, occurrence of the abnormal combustion can be estimated before the abnormal combustion starts.

BRIEF DESCRIPTION OF DRAWINGS

FIG. 8B is a flowchart illustrating the processing by the control device according to the embodiment.

DESCRIPTION OF EMBODIMENTS

First Embodiment

Figure 1:
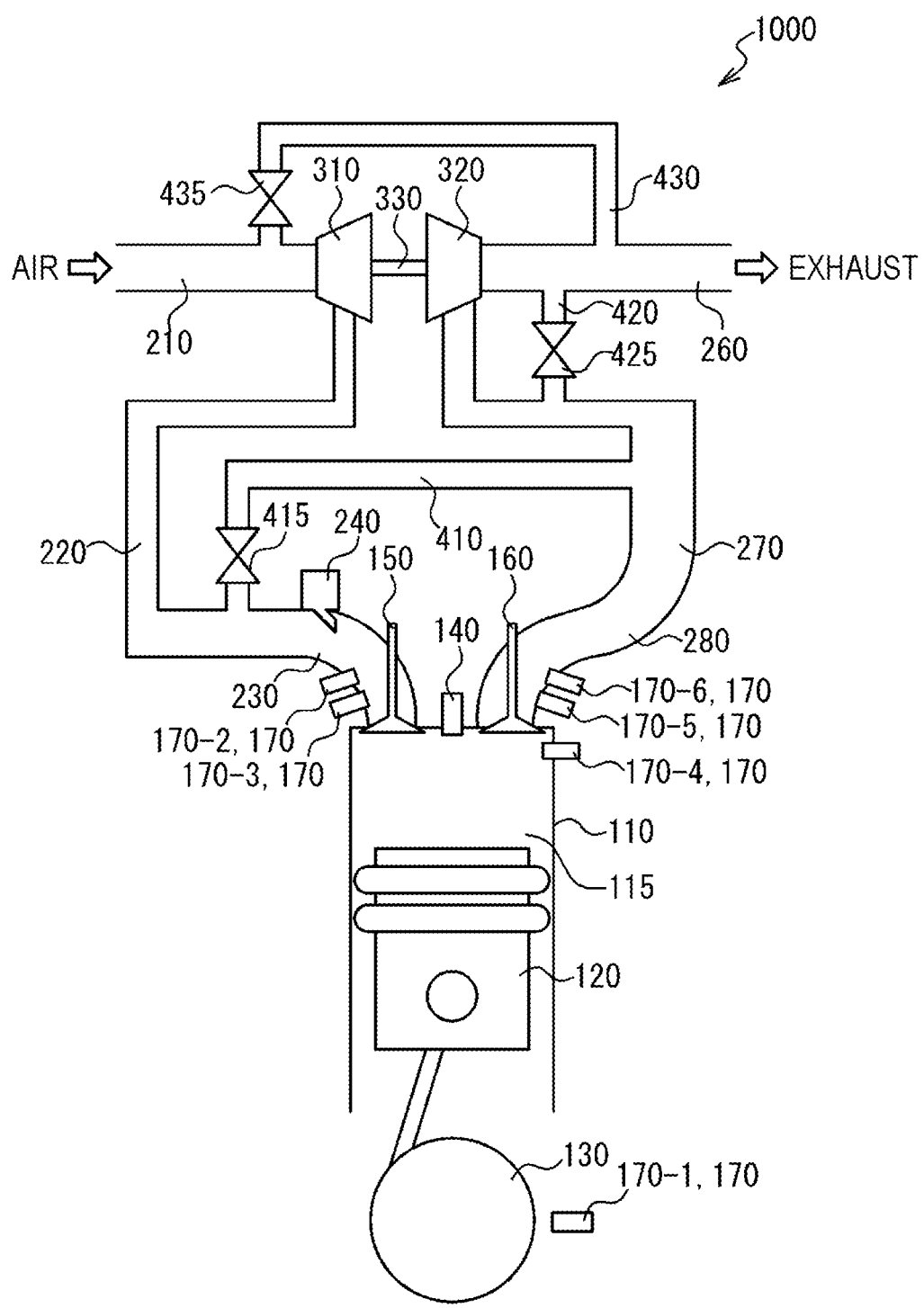
FIG. 1 is a view illustrating the configuration of an engine according to an embodiment.

An engine 1000 according to the present embodiment of the present invention will be described with reference to the drawings. As illustrated in FIG. 1, the engine 1000 takes in air from an air inlet 210. The intake air passes through an intake pipe 220, is mixed with hydrogen injected from a hydrogen injection device 240 in an intake port 230, and is supplied to a combustion chamber 115 in a cylinder 110 as a gas mixture. The gas mixture supplied to the combustion chamber 115 is compressed by a piston 120, and is ignited by an ignition device 140 such as a diesel injection device. The gas mixture expands when combusted, pushes the piston 120, and causes a crankshaft 130 to rotate. The combusted gas mixture is discharged as combustion gas from the combustion chamber 115 to an exhaust port 280, passes through a second exhaust pipe 270 and a first exhaust pipe 260, and is discharged to the outside.

Here, the ignition device 140 ignites gas in the combustion chamber 115 when the piston 120 reaches a top dead center, which is, for example, immediately after having moved beyond the top dead center. However, when the temperature of the combustion chamber 115 increases, pre-ignition in which hydrogen contained in gas in the combustion chamber 115 is combusted might occur before the piston 120 reaches the top dead center. Thus, the engine 1000 estimates a temperature in the combustion chamber 115, e.g., the cylinder 110, when the piston 120 is at the top dead center position, and performs a control of reducing pre-ignition when the estimated temperature is higher than a reference value. As a result, the engine 1000 performs a control of reducing abnormal combustion before the abnormal combustion occurs. Note that the reference value to be compared with the estimated temperature indicates a value corresponding to an ignition temperature at which hydrogen spontaneously ignites, and is determined, for example, based on the pressure level and hydrogen equivalent ratio of gas in the combustion chamber 115 (cylinder 110) and the rotation speed of the engine 1000. The hydrogen equivalent ratio indicates the concentration of hydrogen in gas in the combustion chamber 115, and for gas in the combustion chamber 115, indicates a value obtained by dividing a theoretical air-fuel ratio, which is an air-fuel ratio having the highest combustion efficiency in theory, by an actual air-fuel ratio, for example.

(Configuration of Engine)

The configuration of the engine 1000 illustrated in FIG. 1 will be described. The engine 1000 includes, for example, the cylinder 110, the piston 120, the crankshaft 130, a sensor 170, the hydrogen injection device 240, and a compression device 310. The cylinder 110 is configured to form the combustion chamber 115 surrounded by wall surfaces of the cylinder 110 and the upper surface of the piston 120. The cylinder 110 includes the ignition device 140, an intake valve 150, and an exhaust valve 160. Note that the upward direction in the cylinder 110 indicates a direction from the piston 120 to the ignition device 140 in the axial direction of the cylinder 110.

The ignition device 140 is configured to ignite gas in the combustion chamber 115, such as gas containing hydrogen. The ignition device 140 includes, for example, a pilot liquid injection device that injects pilot liquid (e.g., light oil). The pilot liquid injected from the pilot liquid injection device is ignited by the temperature in the combustion chamber 115. Flame generated by ignition of the pilot liquid ignites gas in the combustion chamber 115, such as hydrogen. As a result, the gas in the combustion chamber 115 is combusted. The ignition device 140 may be a spark ignition device (e.g., ignition plug) that generates a spark.

The intake valve 150 is configured to open when the gas mixture containing hydrogen is taken into the combustion chamber 115. When the intake valve 150 is opened, the gas mixture is taken into the cylinder 110 from the intake port 230. The exhaust valve 160 is configured to open when the combustion gas combusted in the combustion chamber 115 is discharged to the outside of the combustion chamber 115. When the exhaust valve 160 is opened, the combustion gas in the cylinder 110 is discharged to the exhaust port 280. The intake valve 150 and the exhaust valve 160 operate according to the angle of the crankshaft 130, for example.

The piston 120 reciprocates in the axial direction of the cylinder 110 to compress gas in the combustion chamber 115. When the piston 120 reciprocates once, the crankshaft 130 is rotated once. Moreover, the piston 120 reciprocates twice, for example, when gas in the combustion chamber 115 is combusted once.

The crankshaft 130 is rotated by reciprocation of the piston 120, and transmits generated rotational force to the outside. The rotation speed of the engine 1000 indicates the number of rotations of the crankshaft 130 per unit time. Moreover, the rotation speed of the engine 1000 indicates the number of reciprocations of the piston 120 per unit time.

The hydrogen injection device 240 is configured to inject hydrogen into air flowing in the intake port 230. The hydrogen injection device 240 injects hydrogen to generate the gas mixture of air and hydrogen. The generated gas mixture is supplied to the cylinder 110.

The compression device 310 compresses air taken in from the air inlet 210. The compressed air is discharged to the intake pipe 220. The compression device 310 is connected to an exhaust turbine 320 through a shaft 330. As the shaft 330 rotates, the compression device 310 compresses air.

The exhaust turbine 320 takes in the combustion gas discharged from the cylinder 110 through the second exhaust pipe 270, and discharges the combustion gas to the first exhaust pipe 260. The exhaust turbine 320 utilizes the flow of combustion gas to rotate the shaft 330.

The engine 1000 may have a branch pipe 420 that connects the second exhaust pipe 270 and the first exhaust pipe 260 to each other. The branch pipe 420 discharges the combustion gas from the second exhaust pipe 270 to the first exhaust pipe 260 without the combustion gas passing through the exhaust turbine 320. The branch pipe 420 is provided with a branch valve 425. The branch valve 425 adjusts the flow rate of the combustion gas discharged from the second exhaust pipe 270 to the first exhaust pipe 260. The branch valve 425 adjusts the flow rate of the combustion gas passing through the branch pipe 420 to adjust the flow rate of the combustion gas passing through the exhaust turbine 320. As a result, the branch valve 425 controls the rotational force to be applied to the shaft 330 by the exhaust turbine 320.

The engine 1000 may have a first exhaust recirculation pipe 410 that connects the second exhaust pipe 270 and the intake pipe 220 to each other. The first exhaust recirculation pipe 410 discharges the combustion gas from the second exhaust pipe 270 to the intake pipe 220, and for example, functions as a high pressure loop exhaust gas recirculation (HP-EGR). The first exhaust recirculation pipe 410 is provided with a first exhaust recirculation valve 415 that adjusts the flow rate of the passing combustion gas. The first exhaust recirculation pipe 410 may be provided with a recirculation cooling device that cools the passing combustion gas.

The engine 1000 may have a second exhaust recirculation pipe 430 that connects the first exhaust pipe 260 and the air inlet 210 to each other. The second exhaust recirculation pipe 430 discharges the combustion gas from the first exhaust pipe 260 to the air inlet 210, and for example, functions as a low pressure loop exhaust gas recirculation (LP-EGR). The second exhaust recirculation pipe 430 is provided with a second exhaust recirculation valve 435 that adjusts the flow rate of the passing combustion gas. The second exhaust recirculation pipe 430 may be provided with a recirculation cooling device that cools the passing combustion gas.

An intercooler may be provided in the intake pipe 220 connecting the compression device 310 and the intake port 230 to each other. In addition, the air inlet 210 may be provided with an air filter that removes a foreign substance such as dust from air taken in from the outside. Further, the first exhaust pipe 260 may be provided with a removal device for removing a harmful substance from the combustion gas, such as a catalyst or a diesel particulate filter (DPF).

The sensor 170 measures the state of the engine 1000. For example, the sensor 170 includes a rotation sensor 170-1 that measures the rotation speed of the crankshaft 130. The rotation sensor 170-1 may measure the rotation angle of the crankshaft 130, for example, a rotation angle with reference to the rotation angle when the piston 120 is at the top dead center position being "0" degrees.

In addition, the sensor 170 measures the state of gas in the engine 1000, which is, for example, the states of the gas mixture and the combustion gas, such as a pressure value indicating the level of the pressure and a temperature. For example, the sensor 170 includes an intake pressure sensor 170-2 configured to measure the pressure value of the gas mixture supplied to the cylinder 110. Moreover, the sensor 170 includes an intake temperature sensor 170-3 configured to measure the temperature of the gas mixture supplied to the cylinder 110. The intake temperature sensor 170-3 may measure the temperature of the wall surface of the intake port 230 to determine the temperature of the gas mixture. The intake pressure sensor 170-2 and the intake temperature sensor 170-3 are provided, for example, in the intake port 230. The intake pressure sensor 170-2 and the intake temperature sensor 170-3 may be provided, for example, in the intake pipe 220.

In addition, the sensor 170 may have a cylinder internal pressure sensor 170-4 configured to measure the pressure value of gas in the combustion chamber 115, such as the gas mixture and the combustion gas. The cylinder internal pressure sensor 170-4 is provided at a position where the pressure value of gas in the combustion chamber 115 can be measured when the piston 120 is at the top dead center position. For example, the cylinder internal pressure sensor 170-4 is arranged on the upper side in the cylinder 110, for example, near the intake valve 150 or the exhaust valve 160.

The sensor 170 may include an exhaust pressure sensor 170-5 configured to measure the pressure value of the combustion gas discharged from the cylinder 110. The sensor 170 may include an exhaust temperature sensor 170-6 configured to measure the temperature of the combustion gas discharged from the cylinder 110. The exhaust temperature sensor 170-6 may measure the temperature of the wall surface of the exhaust port 280 to determine the temperature of the combustion gas. The exhaust pressure sensor 170-5 and the exhaust temperature sensor 170-6 are provided, for example, in the exhaust port 280. The exhaust pressure sensor 170-5 and the exhaust temperature sensor 170-6 may be provided in the second exhaust pipe 270.

Figure 2:
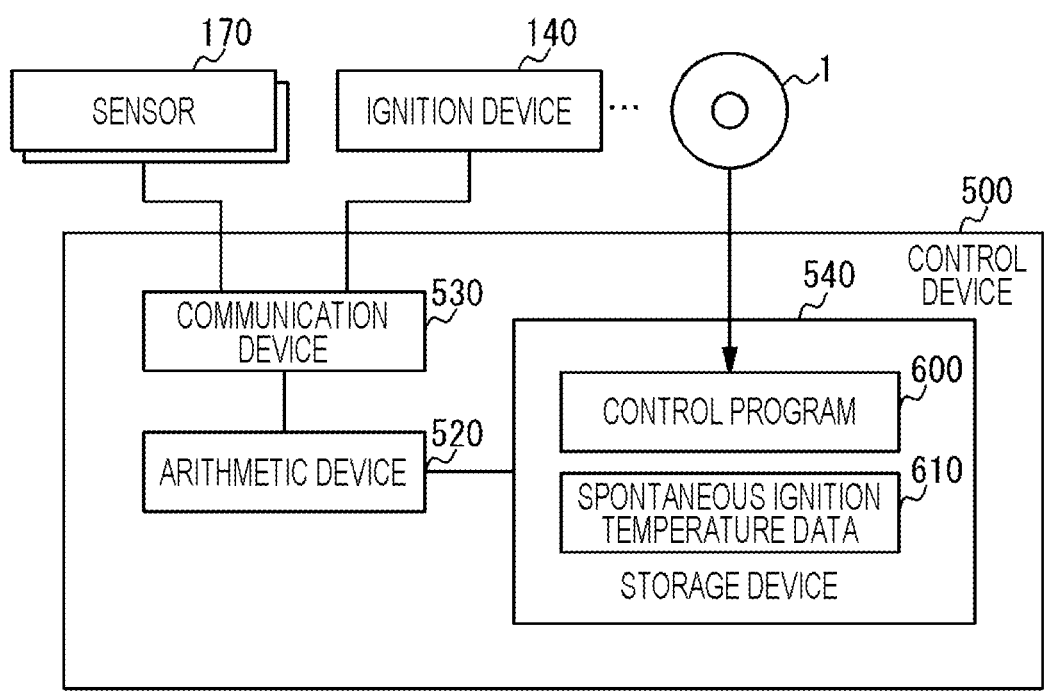
FIG. 2 is a diagram illustrating the configuration of a control device according to the embodiment.

The engine 1000 further includes a control device 500 illustrated in FIG. 2. The control device 500 controls operation of the engine 1000. The control device 500 includes, for example, an arithmetic device 520, a communication device 530, and a storage device 540. The communication device 530 communicates with each device provided in the engine 1000. For example, the communication device 530 acquires a signal indicating information measured by the sensor 170. In addition, the communication device 530 outputs a signal for igniting gas in the combustion chamber 115 to the ignition device 140. The communication device 530 may output a signal for controlling the compression ratio of air by the compression device 310. For example, the communication device 530 may transmit and receive a signal in accordance with a serial communication protocol defined for a device on which the engine 1000 is mounted, such as a controller area network (CAN) of a vehicle. Further, the communication device 530 may include various interfaces for communicating with an external terminal, such as a network interface card (NIC) and a universal serial bus (USB).

The storage device 540 stores various types of data for controlling the engine 1000, such as a control program 600 and spontaneous ignition temperature data 610. The storage device 540 is used as a non-transitory tangible storage medium that stores the control program 600. The control program 600 may be provided as a computer program product recorded in a computer-readable storage medium 1, or may be provided as a computer program product downloadable from a server.

Figure 3:
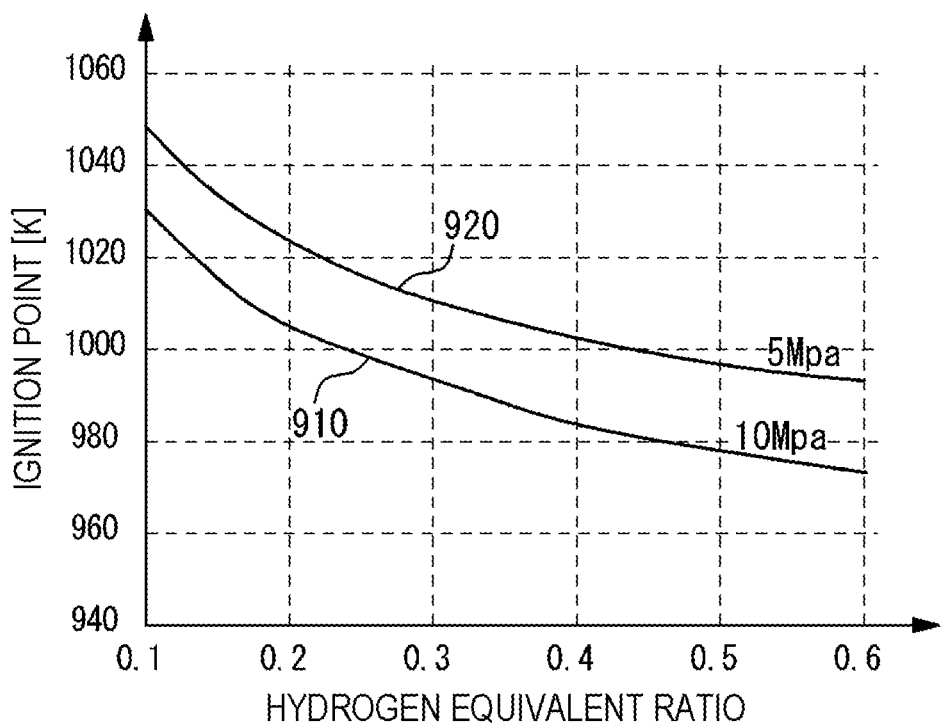
FIG. 3 is a graph illustrating a relationship among the ignition point of hydrogen, a hydrogen equivalent ratio, and the pressure value of a gas mixture.

The spontaneous ignition temperature data 610 indicates a first reference value determined based on the pressure value of gas in the combustion chamber 115, the hydrogen equivalent ratio of gas in the combustion chamber 115, and the rotation speed of the engine 1000. The first reference value is expressed according to an ignition point at which hydrogen spontaneously ignites. As illustrated in FIG. 3, the ignition point of hydrogen changes according to the hydrogen equivalent ratio and the pressure value. For example, a first spontaneous ignition line 910 indicates a relationship between the hydrogen equivalent ratio and the ignition point when the pressure value is 10 MPa. A second spontaneous ignition line 920 indicates a relationship between the hydrogen equivalent ratio and the ignition point when the pressure value is 5 MPa. In addition, when hydrogen spontaneously ignites, predetermined time is required until the hydrogen spontaneously ignites after the temperature has reached the ignition point.

On the other hand, since the piston 120 moves up and down, the pressure value and temperature of gas in the combustion chamber 115 illustrated in FIG. 1 change over time. Here, a predetermined period with respect to a point when the piston 120 is at the top dead center position, such as a period in which the crank angle is −30 degrees to 30 degrees, is set as a period in which the pressure value and the temperature are the highest. The spontaneous ignition temperature data 610 indicates a relationship among the pressure value, hydrogen equivalent ratio, and temperature of gas when hydrogen is ignited in this period. For example, the first reference value indicated by the spontaneous ignition temperature data 610 indicates a value obtained by subtracting a predetermined value from a temperature at which hydrogen is ignited, which is determined according to the pressure value and hydrogen equivalent ratio of gas in this period. The predetermined value to be subtracted is set so that ignition of hydrogen can be suppressed with a margin.

For example, as illustrated in FIG. 3, the first reference value indicated by the spontaneous ignition temperature data 610 decreases because the ignition point of hydrogen decreases as the hydrogen equivalent ratio increases. The first reference value decreases as the pressure value increases. Since the period in which the pressure value and the temperature are the highest becomes shorter as the rotation speed of the engine 1000 increases, the first reference value increases as the rotation speed increases. As described above, the spontaneous ignition temperature data 610 indicates the first reference value according to the pressure value and hydrogen equivalent ratio of gas in the combustion chamber 115 and the rotation speed of the engine 1000. The spontaneous ignition temperature data 610 may be determined by simulation or by a test for hydrogen ignition. For example, the spontaneous ignition temperature data 610 may include a lookup table that outputs the first reference value using the pressure value and hydrogen equivalent ratio of gas and the rotation speed of the engine 1000 as arguments.

The arithmetic device 520 illustrated in FIG. 2 reads the control program 600 from the storage device 540 and executes the control program 600 to perform various types of data processing for controlling the engine 1000. For example, the arithmetic device 520 includes an electronic control unit (ECU). In addition, the electronic control unit may be implemented by the arithmetic device 520 and the storage device 540, or may be implemented by the control device 500.

Figure 4:
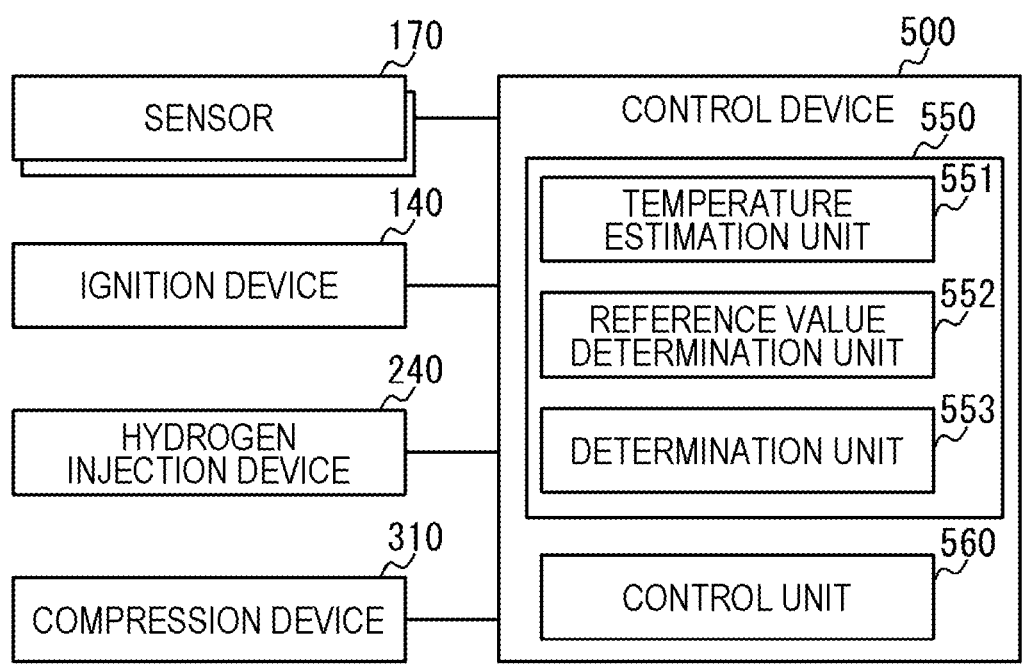
FIG. 4 is a diagram illustrating functional blocks implemented by the control device according to the embodiment.

The arithmetic device 520 reads and executes the control program 600 to implement an abnormal combustion estimation unit 550 and a control unit 560 as illustrated in FIG. 4. The abnormal combustion estimation unit 550 estimates occurrence of the abnormal combustion based on the pressure value, hydrogen equivalent ratio, and temperature of gas in the combustion chamber 115 and the rotation speed of the engine 1000. When occurrence of the abnormal combustion is estimated, the control unit 560 controls the engine 1000 to reduce occurrence of the abnormal combustion.

The abnormal combustion estimation unit 550 includes a temperature estimation unit 551, a reference value determination unit 552, and a determination unit 553. The temperature estimation unit 551 estimates a compression temperature indicating the temperature of gas when the piston 120 is at the top dead center position. The reference value determination unit 552 determines the first reference value based on the pressure value and hydrogen equivalent ratio of gas and the rotation speed of the engine 1000. The determination unit 553 compares the determined first reference value with the estimated compression temperature to determine whether or not the abnormal combustion has occurred.

(Operation of Engine)

For example, an operation of estimating occurrence of the abnormal combustion based on the temperature of the gas mixture taken into the cylinder 110, the pressure value of the gas mixture taken into the cylinder 110, and the rotation speed of the engine 1000 will be described. When the engine 1000 is started, the arithmetic device 520 executes the control program 600 to execute processing illustrated in FIG. 5, which is part of a control method. In Step S110, the temperature estimation unit 551 implemented by the arithmetic device 520 estimates the compression temperature of gas in the combustion chamber 115 based on the temperature of the gas mixture. For example, the temperature estimation unit 551 acquires the temperature measured by the intake unit 170-3 illustrated in FIG. 1 as the temperature of the gas mixture taken into the cylinder 110. For example, the temperature estimation unit 551 acquires the temperature measured when the intake valve 150 is opened as the temperature of the gas mixture taken into the cylinder 110. The temperature estimation unit 551 determines the compression temperature $T_{comp}$ based on Equation (1). Equation (1) is derived based on the first law of thermodynamics, the ideal gas law, and the polytropic relationship equation.

[Equation 1]

$$T_{comp} = T_{in} \times \varepsilon^{n-1} \qquad (1)$$

where $T_{in}$ indicates the temperature of the gas mixture taken into the cylinder 110, $\varepsilon$ indicates the geometrical compression ratio of the combustion chamber 115, and n indicates a polytropic index.

Figure 5:
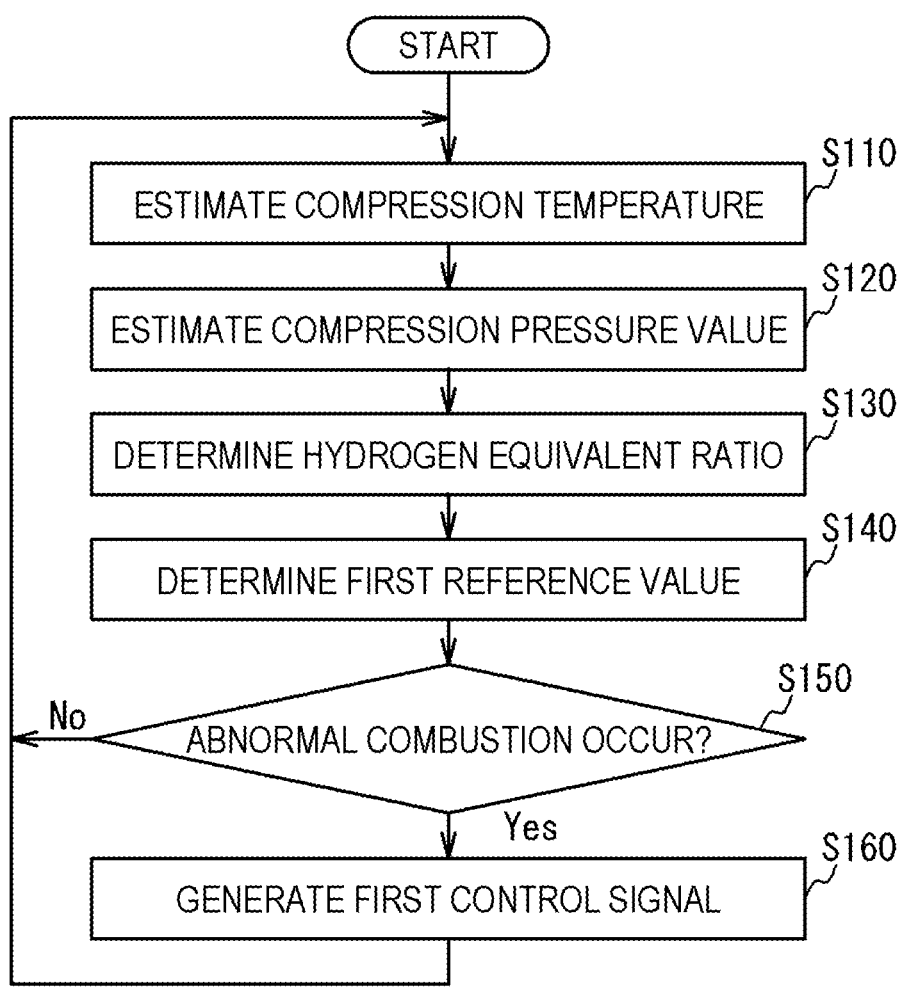
FIG. 5 is a flowchart illustrating processing by the control device according to the embodiment.

In Step S120 illustrated in FIG. 5, the reference value determination unit 552 estimates, based on the pressure value of the gas mixture, a compression pressure value indicating the pressure value in the combustion chamber 115 when the piston 120 is at the top dead center position. For example, the reference value determination unit 552 acquires the pressure value measured by the intake pressure sensor 170-2 illustrated in FIG. 1 as the pressure value of the gas mixture taken into the cylinder 110. For example, the reference value determination unit 552 acquires the pressure value measured when the intake valve 150 is opened as the pressure value of the gas mixture taken into the cylinder 110. The reference value determination unit 552 determines the compression pressure value $P_{comp}$ based on Equation (2). Equation (2) is derived based on the first law of thermodynamics, the ideal gas law, and the polytropic relationship equation.

[Equation 2]

$$P_{comp} = P_{in} \times \varepsilon^{n} \qquad (2)$$

where $P_{in}$ indicates the pressure value of the gas mixture taken into the cylinder 110, $\varepsilon$ indicates the geometrical compression ratio of the combustion chamber 115, and n indicates a polytropic index.

In Step S130 illustrated in FIG. 5, the reference value determination unit 552 determines the hydrogen equivalent ratio in the combustion chamber 115 based on the temperature of the gas mixture, the pressure value of the gas mixture, and the rotation speed of the engine 1000. For example, the reference value determination unit 552 determines the hydrogen equivalent ratio $\Phi$ using Equation (3).

[Equation 3]

$$\Phi = \frac{1}{\lambda} = \frac{G_{fuel} \times A_{st\_gas}}{G_{Air}} \qquad (3)$$

where λ indicates an air excess ratio, and $G_{Air}$ indicates the mass flow rate of air supplied to the cylinder 110. $G_{fuel}$ indicates the mass flow rate of hydrogen, and indicates the injection amount of hydrogen instructed to the hydrogen injection device 240 by the arithmetic device 520. $A_{st\_gas}$ indicates the theoretical mixing ratio of hydrogen, and is a fixed value.

Thus, the reference value determination unit 552 determines the mass flow rate $G_{Air}$ of air based on the temperature of the gas mixture, the pressure value of the gas mixture, and the rotation speed of the engine 1000. For example, the reference value determination unit 552 determines the mass flow rate $G_{Air}$ of air based on the temperature and pressure value of the gas mixture taken into the cylinder 110 and the rotation speed of the engine 1000. For example, the reference value determination unit 552 uses the values used in Steps S110 and S120 as the temperature and pressure value of the gas mixture taken into the cylinder 110. In addition, the reference value determination unit 552 acquires the rotation speed of the engine 1000 measured from the rotation sensor 170-1. For example, the reference value determination unit 552 determines the mass flow rate $G_{Air}$ of air using Equation (4). Equation (4) is derived based on the ideal gas law.

[Equation 4]

$$G_{Air} = \eta_{vcor} \times \frac{P_{in} \times V_{swpt}}{R \times T_{in}} \times \frac{60 \times N}{2} \quad (4)$$

where $\eta_{vcor}$ indicates the volumetric efficiency of air, $V_{swpt}$ indicates a total stroke volume in the cylinder 110, R indicates a gas constant, and N indicates the rotation speed of the engine 1000. $P_{in}$ indicates the pressure value of the gas mixture taken into the cylinder 110, and $T_{in}$ indicates the temperature of the gas mixture taken into the cylinder 110. Here, the volumetric efficiency $\eta_{vcor}$ is determined from the pressure of the gas mixture, the injection amount of hydrogen, and the like by a known method. For example, the volumetric efficiency $\eta_{vcor}$ is calculated, in a test for the engine 1000, based on an air flow rate measured while changing the rotation speed, the hydrogen injection amount, the air excess ratio, and the like. R indicates a fixed value such as 287, and $V_{swpt}$ indicates a fixed value according to the number of cylinders 110 and the shape of the cylinders 110 in the engine 1000.

The reference value determination unit 552 determines the hydrogen equivalent ratio of gas in the combustion chamber 115 based on the determined mass flow rate $G_{Air}$ of air and Equation (3).

In Step S140, the reference value determination unit 552 determines the first reference value based on the spontaneous ignition temperature data 610. For example, the reference value determination unit 552 acquires, from the spontaneous ignition temperature data 610, the first reference value corresponding to the estimated gas pressure value $P_{comp}$, the hydrogen equivalent ratio Φ, and the rotation speed N of the engine 1000.

In Step S150, the determination unit 553 determines whether or not the abnormal combustion occurs, based on the determined compression temperature $T_{comp}$ and the first reference value. For example, the determination unit 553 determines whether or not the compression temperature $T_{comp}$ is greater than the first reference value. When the compression temperature $T_{comp}$ is greater than the first reference value, the determination unit 553 determines that the abnormal combustion occurs. When the compression temperature $T_{comp}$ is the first reference value or less, the determination unit 553 determines that the abnormal combustion does not occur. When it is determined that the abnormal combustion does not occur, the processing returns to Step S110 and is repeated. When it is determined that the abnormal combustion occurs, the processing proceeds to Step S160.

In Step S160, the control unit 560 generates a first control signal for reducing occurrence of the abnormal combustion, and outputs the first control signal to a corresponding device. For example, the control unit 560 generates a first control signal for delaying timing of igniting the gas mixture by the ignition device 140. In response to the first control signal from the control unit 560, the ignition device 140 delays the timing of igniting the gas mixture. For example, the ignition device 140 delays timing of injecting the pilot liquid (e.g., light oil).

The control unit 560 may generate a first control signal for controlling the hydrogen equivalent ratio. For example, the control unit 560 generates a first control signal for increasing the compression ratio of air by the compression device 310 illustrated in FIG. 1. In this case, the control unit 560 generates, for example, a first control signal for decreasing the combustion gas passing through the branch valve 425. When receiving the first control signal, the branch valve 425 decreases the cross-sectional area of a flow path in which the combustion gas flows such that the passing combustion gas decreases. As the combustion gas passing through the branch valve 425 decreases, the combustion gases passing through the exhaust turbine 320 increases. As the combustion gas passing through the exhaust turbine 320 increases, the rotational force of the shaft 330 increases, and the compression ratio of air by the compression device 310 increases. Since the air flowing into the intake port 230 increases, the hydrogen equivalent ratio decreases.

The control unit 560 may generate a first control signal for decreasing the combustion gas passing through the first exhaust recirculation valve 415. For example, the first exhaust recirculation valve 415 decreases the cross-sectional area of the flow path in which the combustion gas flows such that the passing combustion gas decreases. As the combustion gas passing through the first exhaust recirculation valve 415 decreases, the air flowing into the intake port 230 increases. Since the air flowing into the intake port 230 increases, the hydrogen equivalent ratio decreases.

The control unit 560 may generate a first control signal for decreasing the injection amount of hydrogen from the hydrogen injection device 240. When the injection amount of hydrogen decreases, the control unit 560 may generate a second control signal for increasing the pilot liquid discharged from the ignition device 140 according to a decrease in hydrogen. As a result, occurrence of the abnormal combustion is reduced while the output of the engine 1000 is maintained.

In this manner, the control device 500 estimates occurrence of the abnormal combustion by comparing the temperature of gas in the combustion chamber 115 with the first reference value. When occurrence of the abnormal combustion is estimated, the control device 500 controls the engine 1000 to reduce occurrence of the abnormal combustion. As a result, the control device 500 can reduce occurrence of the abnormal combustion before occurrence of the abnormal combustion.

Second Embodiment

For example, occurrence of abnormal combustion may be determined based on a pressure value in a cylinder 110, the temperature of a gas mixture taken into the cylinder 110, and the rotation speed of an engine 1000. In this case, the configuration of the engine 1000 is similar to that of the first embodiment, and therefore, description thereof will be omitted.

(Operation of Engine)

For example, in Step S110 illustrated in FIG. 5, the temperature estimation unit 551 estimates the compression temperature $T_{comp}$ using the pressure value measured by the cylinder internal pressure sensor 170-4. For example, the temperature estimation unit 551 determines the compression temperature $T_{comp}$ using Equation (5). Equation (5) is derived using the ideal gas law.

[Equation 5]

$$T_{comp} = \frac{P_{comp} \times V_{comp}}{W_g \times R_g} \quad (5)$$

where $P_{comp}$ indicates the pressure value measured by the cylinder internal pressure sensor 170-4 when the piston 120 is at the top dead center position. $V_{comp}$ indicates the volume of the combustion chamber 115 when the piston 120 is at the top dead center position, and indicates a fixed value according to the shape of the cylinder 110. $R_g$ indicates a gas constant, and indicates a fixed value such as 8.314.

$W_g$ indicates the total number of moles of working gas, and is determined by Equation (6).

[Equation 6]

$$w_g = n_{IVC} \quad (6)$$

where $n_{IVC}$ indicates the number of moles of gas in the cylinder 110 when the intake valve 150 is closed. $n_{IVC}$ is determined by Equation (7) derived based on the ideal gas law.

[Equation 7]

$$n_{IVC} = \frac{P_{IVC} \times V_{IVC}}{R_g \times (T_{in\_cyl} + 273.15)} \quad (7)$$

where $P_{IVC}$ indicates a pressure value in the cylinder when the intake valve 150 is closed, and for example, indicates the pressure value measured by the cylinder internal pressure sensor 170-4 when the intake valve 150 is closed. $P_{IVC}$ may indicate the compression value measured by the cylinder internal pressure sensor 170-4 when the intake valve 150 is opened. $V_{IVC}$ indicates the capacity of the combustion chamber 115 when the intake valve 150 is closed, and is determined based on the shape of the cylinder 110 and the crank angle indicating the rotation angle of the crankshaft 130. $T_{in\_cyl}$ indicates the temperature of gas in the combustion chamber 115, such as the gas mixture and the combustion gas, when the intake valve 150 is closed. Here, $T_{in\_cyl}$ is substituted for the temperature $T_{in}$ measured by the intake temperature sensor 170-3 when the intake valve 150 is closed. $T_{in\_cyl}$ may be substituted for the temperature $T_{in}$ measured by the intake temperature sensor 170-3 when the intake valve 150 is opened.

In Step S120 illustrated in FIG. 5, the reference value determination unit 552 uses the pressure value measured by the cylinder internal pressure sensor 170-4 as the compression pressure value $P_{comp}$. For example, when the piston 120 is at the top dead center position, the reference value determination unit 552 determines the pressure value measured by the cylinder internal pressure sensor 170-4 as the compression pressure value $P_{comp}$.

In Step S130 illustrated in FIG. 5, the reference value determination unit 552 determines the hydrogen equivalent ratio using the pressure value measured by the cylinder internal pressure sensor 170-4 when the intake valve 150 is closed. For example, the reference value determination unit 552 uses the pressure value $P_{IVC}$ measured by the cylinder internal pressure sensor 170-4 when the intake valve 150 is closed as $P_{in}$ indicating the pressure value of the gas mixture taken into the cylinder 110 according to Equation (4). As $P_{in}$, the pressure value measured by the cylinder internal pressure sensor 170-4 when the intake valve 150 is opened may be used. As a result, the reference value determination unit 552 determines the hydrogen equivalent ratio according to Equation (3) and Equation (4).

Since the processing from Step S140 to Step S160 is similar to that of the first embodiment, description thereof will be omitted.

As described above, the control device 500 can estimate occurrence of the abnormal combustion based on the pressure value in the cylinder 110, the temperature of the gas mixture taken into the cylinder 110, and the rotation speed of the engine 1000.

$T_{in\_cyl}$ indicating the temperature in the combustion chamber 115 may be determined based on the temperature of the gas mixture supplied to the cylinder 110 and the temperature of the combustion gas discharged from the cylinder 110. For example, assuming that in the combustion chamber 115, the temperature of the gas mixture indicates the temperature of the gas mixture supplied to the cylinder 110 and the temperature of the combustion gas indicates the temperature of the combustion gas discharged from the cylinder 110, Equation (8) is derived from the Charles' law.

[Equation 8]

$$T_{in\_cyl} = \frac{T_{in}}{\frac{\varepsilon - 1}{1} + \frac{1}{\varepsilon}\left(\frac{T_{in}}{T_{ex}}\right)} \quad (8)$$

where $T_{in}$ indicates the temperature of the gas mixture taken into the cylinder 110, and indicates the temperature measured by the intake temperature sensor 170-3 when the intake valve 150 is opened. $T_{ex}$ indicates the temperature of the combustion gas discharged from the cylinder 110, and indicates the temperature measured by the exhaust temperature sensor 170-6 when the exhaust valve 160 is opened.

As described above, the control device 500 may estimate occurrence of the abnormal combustion based on the pressure value in the cylinder 110, the temperature of the gas mixture taken into the cylinder 110, the temperature of the combustion gas discharged from the cylinder 110, and the rotation speed of the engine 1000.

Here, the reference value determination unit 552 of the control device 500 may perform zero point correction for the pressure value measured by the cylinder internal pressure sensor 170-4 by using the pressure value measured by the intake pressure sensor 170-2. For example, when the intake valve 150 is opened, the reference value determination unit 552 determines a correction value of the pressure value measured by the cylinder internal pressure sensor 170-4 such that the pressure value measured by the cylinder internal pressure sensor 170-4 is equal to the pressure value measured by the intake pressure sensor 170-2. The reference value determination unit 552 acquires the pressure value in the cylinder 110 by adding the correction value to the pressure value measured by the cylinder internal pressure sensor 170-4.

The reference value determination unit 552 may perform zero point correction for the pressure value measured by the cylinder internal pressure sensor 170-4 by using the pressure value measured by the exhaust pressure sensor 170-5. The reference value determination unit 552 may perform zero point correction for the pressure value measured by the cylinder internal pressure sensor 170-4 by using two pressure values measured by the intake pressure sensor 170-2 and the exhaust pressure sensor 170-5. For example, the reference value determination unit 552 may determine the correction value such that the sum of a difference between the pressure value of the cylinder internal pressure sensor 170-4 and the pressure value of the intake pressure sensor 170-2 when the intake valve 150 is opened and a difference between the pressure value of the cylinder internal pressure sensor 170-4 and the pressure value of the exhaust pressure sensor 170-5 when the exhaust valve 160 is opened is minimized.

Third Embodiment

For example, a reference value determination unit 552 of a control device 500 may determine a hydrogen equivalent ratio by estimating the blow-through amount of a gas mixture, which has been taken into a cylinder 110 and blown through the cylinder 110 to an exhaust port 280 before the gas mixture is combusted. In this case, the configuration of the engine 1000 is similar to that of the first embodiment, and therefore, description thereof will be omitted.
(Operation of Engine)

Since the processing in Step S110 and Step S120 illustrated in FIG. 5 is similar to that in the first or second embodiment, description thereof will be omitted.

In Step S130, the reference value determination unit 552 determines the hydrogen equivalent ratio Φ according to Equation (9).

[Equation 9]

$$\Phi = \frac{1}{\lambda} = \frac{G_{fuel} \times A_{st\_gas}}{G_{Air} \times (1 - n_{short\_ratio})} \quad (9)$$

where $n_{short\_ratio}$ indicates the ratio of the gas mixture supplied to the cylinder 110 to the gas blown into the exhaust port 280 before combustion, for example, the ratio of the gas mixture to the combustion gas, is calculated according to Equation (10).

[Equation 10]

$$n_{short\_ratio} = \frac{n_{short}}{n_{air} + n_{fuel}} \quad (10)$$

where $n_{short}$ indicates the number of moles of gas blown to the exhaust port 280 before combustion. $n_{air}$ indicates the number of moles of air supplied to the cylinder 110, and is determined based on the temperature and pressure of the gas mixture in the intake port 230 when the intake valve 150 is opened. Mud indicates the number of moles of hydrogen supplied to the cylinder 110, and is determined based on the injection amount of hydrogen instructed to the hydrogen injection device 240 by the control device 500.

$n_{short}$ is calculated according to Equation (11).

[Equation 11]

$$n_{short} = (n_{air} + n_{fuel} + n_{res}) - n_{IVC} \quad (11)$$

where $n_{IVC}$ represents the number of moles of gas in the cylinder 110, and is determined according to Equation (7). $n_{res}$ indicates the number of moles of the combustion gas remaining in the cylinder 110, and is determined according to Equation (12). Equation (12) indicates the number of moles of the combustion gas when the piston 120 is at the top dead center position based on the ideal gas law.

[Equation 12]

$$n_{res} = \frac{(P_{ex} + 101.3) \times V_{comp}}{R_g \times (T_{ex} + 273.15)} \quad (12)$$

where $P_{ex}$ indicates the pressure of the combustion gas discharged from the cylinder 110, and indicates the pressure value measured by the exhaust pressure sensor 170-5 when the exhaust valve 160 is opened. As $P_{ex}$, the pressure value measured by the cylinder internal pressure sensor 170-4 when the exhaust valve 160 is opened may be used. $V_{comp}$ indicates the volume of the combustion chamber 115 at a crank angle of 0 degrees. $R_g$ indicates a gas constant. $T_{ex}$ indicates the temperature of the combustion gas discharged from the cylinder 110, and indicates the temperature measured by the exhaust temperature sensor 170-6 when the exhaust valve 160 is opened.

As described above, the reference value determination unit 552 determines the hydrogen equivalent ratio using the values measured by the intake pressure sensor 170-2, the intake temperature sensor 170-3, the exhaust pressure sensor 170-5, and the exhaust temperature sensor 170-6. The reference value determination unit 552 may determine the hydrogen equivalent ratio using the values measured by the cylinder internal pressure sensor 170-4, the intake temperature sensor 170-3, and the exhaust temperature sensor 170-6.

Since the processing from Step S140 to Step S160 is similar to that of the first embodiment, description thereof will be omitted.

As described above, the control device 500 can estimate occurrence of abnormal combustion, considering the blow-through amount of the gas mixture, which has been taken into the cylinder 110 and blown through the cylinder 110 to the exhaust port 280 before the gas mixture is combusted.

The control device 500 may estimate occurrence of the abnormal combustion, considering the flow rate of the combustion gas passing through the first exhaust recirculation pipe 410 and/or the second exhaust recirculation pipe 430 illustrated in FIG. 1. In this case, in Step S130 illustrated in FIG. 5, the control device 500 determines the hydrogen equivalent ratio using the flow rate of the combustion gas passing through the first exhaust recirculation pipe 410 and/or the second exhaust recirculation pipe 430. For example, the control device 500 changes Equation (10) and Equation (11) to equations obtained by adding the number of moles of the combustion gas passing through the first exhaust recirculation pipe 410 and/or the second exhaust recirculation pipe 430 to determine the hydrogen equivalent ratio. In this case, the engine 1000 has a flow rate measurement device that measures the flow rate of the combustion gas passing through the first exhaust recirculation pipe 410 and/or the second exhaust recirculation pipe 430.

Fourth Embodiment

Figure 6:
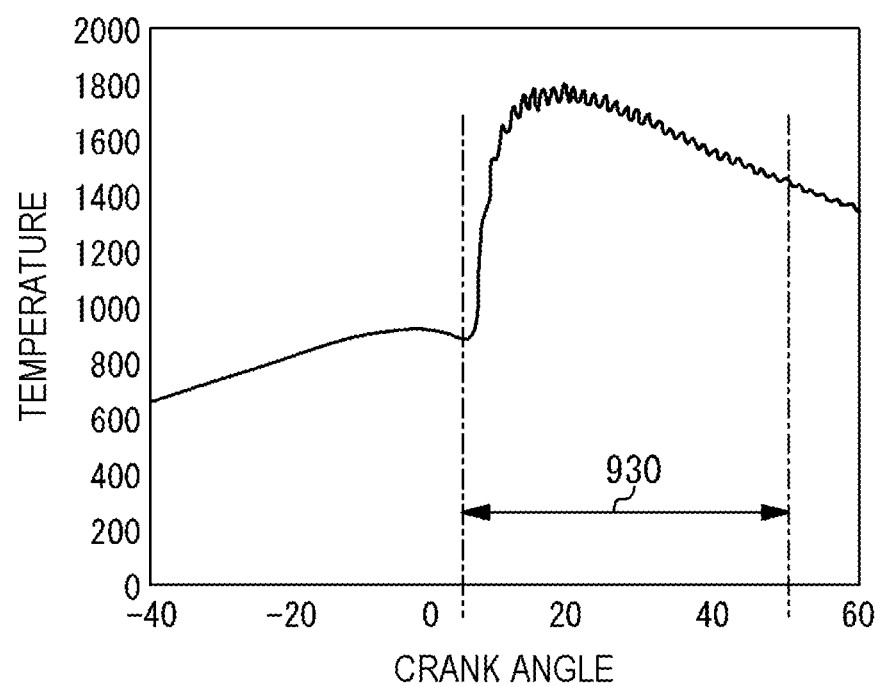
FIG. 6 is a graph illustrating a relationship between the temperature of gas in a combustion chamber and a crank angle in the embodiment.
Figure 7:
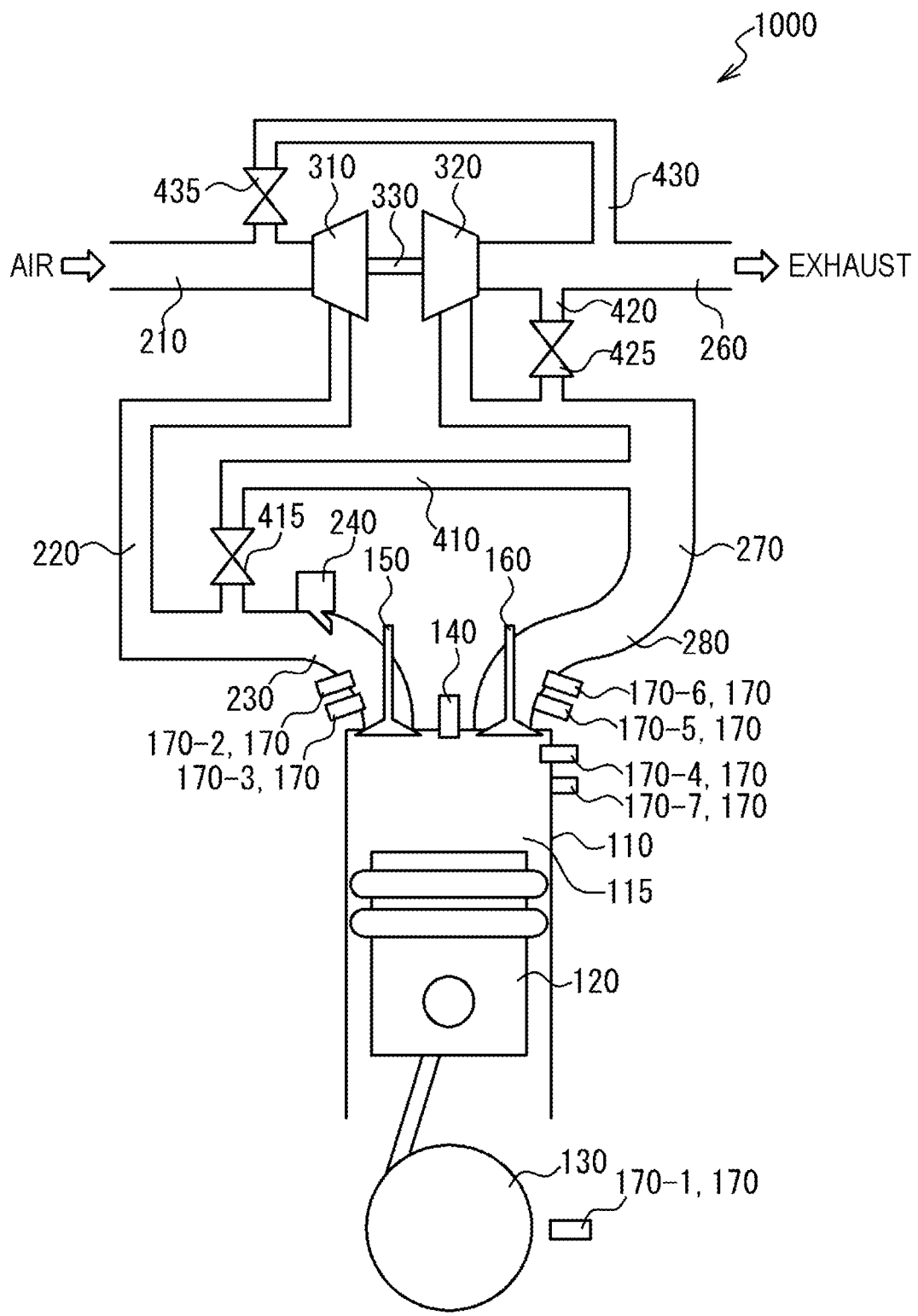
FIG. 7 is a view illustrating the configuration of an engine according to an embodiment.

The inventors have found that abnormal combustion might occur even when a temperature in a combustion chamber 115 is low when a piston 120 is at a top dead center position. In this case, the temperature in the combustion chamber 115 during a period in which a gas mixture is combusted is higher than that during normal combustion. For example, as illustrated in FIG. 6, in a combustion period 930 in which the gas mixture is combusted, the temperature in the combustion chamber 115 before the abnormal combustion occurs is higher than the temperature when the gas mixture is normally combusted. Thus, as illustrated in FIG. 7, an engine 1000 includes a combustion chamber temperature sensor 170-7 that measures a temperature corresponding to the temperature in the combustion chamber 115. The combustion chamber temperature sensor 170-7 is provided, for example, outside a wall surface of a cylinder 110. The combustion chamber temperature sensor 170-7 may be provided at any position at which the temperature corresponding to the temperature in the combustion chamber 115 can be measured, such as a position in the cylinder 110.

The temperature estimation unit 551 illustrated in FIG. 4 determines the temperature of combustion gas in the combustion period 930 based on the temperature measured by the combustion chamber temperature sensor 170-7. A reference value determination unit 552 determines a second reference value for comparison with the temperature of the combustion gas in the combustion period 930 based on the temperature and hydrogen equivalent ratio of the gas mixture and the rotation speed of the engine 1000. A determination unit 553 determines whether or not the abnormal combustion occurs, based on the temperature of the combustion gas in the combustion period 930 and the second reference value. When it is determined that the abnormal combustion occurs, a control unit 560 performs control for reducing the abnormal combustion.

Other configurations are similar to those of the first embodiment, and therefore, description thereof will be omitted.

(Operation of Engine)

Figure 8A:
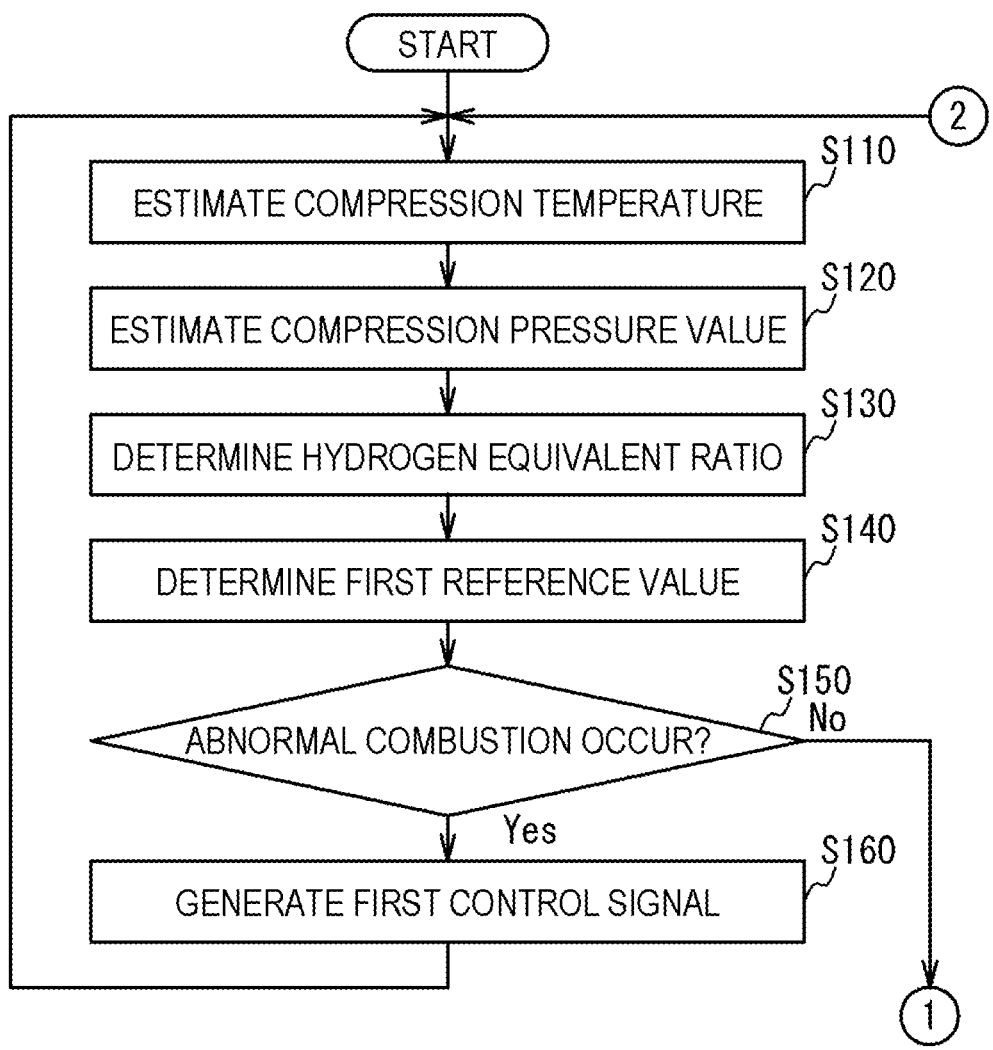
FIG. 8A is a flowchart illustrating processing by a control device according to the embodiment.

A method for controlling the engine 1000 will be described, in which determination using the temperature of the combustion gas in the combustion period 930 is added to the processing of the first embodiment. When the engine 1000 is started, the arithmetic device 520 executes the control program 600 to execute processing illustrated in FIGS. 8A and 8B, which is part of the control method. Since the processing from Step S110 to Step S140 is similar to that of the first embodiment, description thereof will be omitted.

In Step S150, the determination unit 553 determines whether or not the abnormal combustion occurs, based on the determined compression temperature $T_{comp}$ and the first reference value. For example, the determination unit 553 determines whether or not the compression temperature $T_{comp}$ is greater than the first reference value. When the compression temperature $T_{comp}$ is greater than the first reference value, the determination unit 553 determines that the abnormal combustion occurs. When the compression temperature $T_{comp}$ is the first reference value or less, the determination unit 553 determines that the abnormal combustion does not occur. When it is determined that the abnormal combustion occurs, the processing proceeds to Step S160. Since the processing in Step S160 is similar to that of the first embodiment, description thereof will be omitted. When it is determined that the abnormal combustion does not occur, the processing proceeds to Step S210 illustrated in FIG. 8B.

In Step S210, the temperature estimation unit 551 determines the average temperature of the combustion gas in the combustion period 930 based on the temperature measured by the combustion chamber temperature sensor 170-7. For example, the temperature estimation unit 551 estimates, as the average temperature of the combustion gas, the average of the temperature measured by the combustion chamber temperature sensor 170-7 in the combustion period 930. Here, the combustion period 930 indicates the period in which the gas mixture is combusted, and is determined in advance.

In Step S220, the reference value determination unit 552 determines the second reference value for comparison with the average temperature of the combustion gas in the combustion period 930 based on the first reference value. The second reference value is determined by multiplying the first reference value, which corresponds to the ignition point where hydrogen spontaneously ignites, by a predetermined coefficient and subtracting a predetermined value from the product of the predetermined coefficient and the first reference value. The coefficient to be multiplied is determined based on the average temperature of the combustion gas in the combustion period 930 and the compression temperature of gas in the combustion chamber 115 when the piston 120 is at the top dead center position when the gas mixture is normally combusted. The coefficient indicates, for example, a value obtained by dividing the average temperature of the combustion gas in the combustion period 930 by the compression temperature. The coefficient may be a fixed value determined in advance by, e.g., a test or simulation. The average temperature and compression temperature used for the coefficient may be temperatures measured when combustion is performed only with the pilot liquid (e.g., light oil) without injecting hydrogen into gas to be supplied to the cylinder 110. The predetermined value to be subtracted is set so that ignition of hydrogen can be restrained with a margin.

In Step S230, the determination unit 553 determines whether or not the abnormal combustion occurs, based on the average temperature of the combustion gas in the combustion period 930 and the second reference value. For example, the determination unit 553 determines whether or not the average temperature is greater than the second reference value. When the average temperature is greater than the second reference value, the determination unit 553 determines that the abnormal combustion occurs. When the average temperature is the second reference value or less, the determination unit 553 determines that the abnormal combustion does not occur. When it is determined that the abnormal combustion does not occur, the processing returns to Step S110 illustrated in FIG. 8A and is repeated. When it is determined that the abnormal combustion occurs, the processing proceeds to Step S240.

In Step S240, the control unit 560 generates a first control signal for reducing occurrence of the abnormal combustion, and outputs the first control signal to a corresponding device. Since the processing in Step S240 is similar to that in Step S160, description thereof will be omitted.

As described above, the engine 1000 can reduce the abnormal combustion which occurs when the temperature in the combustion chamber 115 is low when the piston 120 is at the top dead center position.

(Modifications)

The configurations described in the embodiments are examples, and may be changed without impairing the functions. For example, in Step S140 illustrated in FIG. 5, the reference value determination unit 552 may determine the first reference value by arithmetic processing using the pressure value of gas in the combustion chamber 115, the hydrogen equivalent ratio of gas in the combustion chamber 115, and the rotation speed of the engine 1000. In this case, the spontaneous ignition temperature data 610 may be omitted.

The example where the reference value determination unit 552 determines the first reference value for comparison with the value of the compression temperature $T_{comp}$ to find which value is greater or smaller has been described, but the present invention is not limited thereto. The reference value determination unit 552 may determine the first reference value based on which the determination unit 553 can estimate occurrence of the abnormal combustion by comparison with the compression temperature $T_{comp}$. For example, the reference value determination unit 552 may determine, as the first reference value, the temperature at which hydrogen ignites based on the pressure value of gas in the combustion chamber 115, the hydrogen equivalent ratio of gas in the combustion chamber 115, and the rotation speed of the engine 1000. In this case, the determination unit 553 estimates that the abnormal combustion occurs when a difference between the compression temperature $T_{comp}$ and the first reference value is less than a predetermined value.

The example where in Step S220 illustrated in FIG. 8B, the reference value determination unit 552 determines the second reference value for comparison with the value of the average temperature of the combustion gas in the combustion period 930 to find which value is greater or smaller has been described, but the present invention is not limited thereto. The reference value determination unit 552 may determine the second reference value based on which the determination unit 553 can estimate occurrence of the abnormal combustion by comparison with the average temperature. For example, the reference value determination unit 552 may determine the first reference value or the second reference value obtained by dividing the temperature at which hydrogen ignites by the compression temperature at which the gas mixture is normally combusted. In this case, the determination unit 553 determines an evaluation value obtained by dividing the average temperature in the combustion period 930 by the average temperature in the combustion period 930 when the gas mixture is normally combusted. When a difference between the second reference value and the evaluation value is less than a predetermined value, the determination unit 553 estimates that the abnormal combustion occurs.

The gas mixture supplied to the cylinder 110 may contain fuel other than hydrogen. For example, a fuel injection device that injects fuel other than hydrogen may be provided in the intake port 230 illustrated in FIG. 1. In this case, when generating the first control signal for decreasing the injection amount of hydrogen from the hydrogen injection device 240, the control unit 560 of the control device 500 may generate a second control signal for increasing the injection amount of fuel other than hydrogen, such as the pilot liquid, in the cylinder 110 according to the amount of decrease in hydrogen. As a result, occurrence of the abnormal combustion is reduced while the output of the engine 1000 is maintained.

The engine 1000 may include a plurality of cylinders 110, and may include an intake manifold between the intake pipe 220 and the intake port 230. In this case, the intake pressure sensor 170-2 and the intake temperature sensor 170-3 may be provided in either the intake port 230 or the intake pipe 220.

The engine 1000 may include an exhaust manifold between the exhaust port 280 and the second exhaust pipe 270. In this case, the exhaust pressure sensor 170-5 and the exhaust temperature sensor 170-6 may be provided in either the exhaust port 280 or the second exhaust pipe 270.

The piston 120 may reciprocate once when gas in the combustion chamber 115 is combusted once. In this case, when calculating $G_{Air}$ using Equation (4), the reference value determination unit 552 calculates $G_{Air}$ according to an equation obtained by doubling the right side of Equation (4).

The embodiments and modifications described above are examples, and the configurations described in the embodiments and the modifications may be arbitrarily changed and/or arbitrarily combined as long as the functions are not impaired. Further, as long as necessary functions can be implemented, some functions described in the embodiments and the modifications may be omitted. For example, all or some of the compression device 310, the first exhaust recirculation pipe 410, and the second exhaust recirculation pipe 430 may be omitted. In a case where the compression device 310 is omitted, the exhaust turbine 320, the shaft 330, and the branch pipe 420 are also omitted.

The sensor 170 that measures the value which is not used in the processing of the arithmetic device 520 of the control device 500 may be omitted.

(Supplemental Description)

The engine, control device, and control program described in each embodiment can be said as follows.

An engine according to a first aspect includes
a cylinder that combusts a gas mixture containing hydrogen inside,
a piston that reciprocates in the cylinder,
an ignition device that ignites the gas mixture,
a rotation sensor that measures the rotation speed of a crankshaft,
an intake temperature sensor that measures the temperature of the gas mixture,
an intake pressure sensor that measures a first pressure value of the gas mixture, and
a control device that controls the hydrogen equivalent ratio of the hydrogen contained in the gas mixture and/or timing of igniting the gas mixture based on the rotation speed, the temperature of the gas mixture, and the first pressure value of the gas mixture.

An engine according to a second aspect is the engine according to the first aspect, in which
the control device includes
an abnormal combustion estimation unit that estimates occurrence of abnormal combustion of the gas mixture based on the rotation speed, the temperature of the gas mixture, and the first pressure value of the gas mixture, and
a control unit that outputs a first control signal for controlling the hydrogen equivalent ratio of the hydrogen contained in the gas mixture and/or the timing of igniting the gas mixture when the occurrence of the abnormal combustion is estimated.

An engine according to a third aspect is the engine according to the second aspect, in which
the abnormal combustion estimation unit includes
a temperature estimation unit that estimates a compression temperature in the cylinder based on the temperature of the gas mixture, a reference value determination unit that determines a first reference value based on the rotation speed, the temperature of the gas mixture, and the first pressure value of the gas mixture, and a determination unit that compares the first reference value and the compression temperature with each other to determine the occurrence of the abnormal combustion of the gas mixture.

An engine according to a fourth aspect is the engine according to the first aspect, which further includes a cylinder internal pressure sensor that measures a second pressure value of gas in the cylinder, the control device including an abnormal combustion estimation unit that estimates occurrence of abnormal combustion of the gas mixture based on the rotation speed, the second pressure value of the gas in the cylinder, and the temperature of the gas mixture, and a control unit that outputs a first control signal for controlling the hydrogen equivalent ratio of the hydrogen contained in the gas mixture and/or the timing of igniting the gas mixture when the occurrence of the abnormal combustion is estimated.

An engine according to a fifth aspect is the engine according to the fourth aspect, in which the abnormal combustion estimation unit includes a temperature estimation unit that estimates a compression temperature in the cylinder based on the temperature of the gas mixture, a reference value determination unit that determines a first reference value based on the rotation speed, the temperature of the gas mixture, and the second pressure value of the gas in the cylinder, and a determination unit that compares the first reference value and the compression temperature with each other to determine the occurrence of the abnormal combustion of the gas mixture.

An engine according to a sixth aspect is the engine according to the fifth aspect, in which the temperature estimation unit estimates the compression temperature based on the temperature of the gas mixture and the second pressure value of the gas in the cylinder.

An engine according to a seventh aspect is the engine according to any one of the third, fifth, and sixth aspects, which further includes in the cylinder, a combustion chamber temperature sensor that measures the temperature of gas, the temperature estimation unit estimating the average temperature of the gas in the cylinder in a combustion period in which the gas mixture is combusted based on the temperature measured by the combustion chamber temperature sensor, the reference value determination unit determining a second reference value based on the first reference value and a temperature in the cylinder when the piston is at a top dead center when the gas mixture is normally combusted, and the determination unit comparing the second reference value and the average temperature with each other to determine the occurrence of the abnormal combustion of the gas mixture.

An engine according to an eighth aspect is the engine according to any one of the second to seventh aspects, in which when the occurrence of the abnormal combustion is estimated, the control unit generates a first control signal for decreasing the hydrogen equivalent ratio, and generates a second control signal for increasing the amount of fuel other than the hydrogen in the cylinder according to a decrease in the hydrogen equivalent ratio.

An engine according to a ninth aspect is the engine according to any one of the first to eighth aspects, which further includes a compression device that compresses air before the hydrogen is injected into the gas mixture, the control device generating a first control signal for increasing the compression ratio of the air by the compression device based on the rotation speed, the temperature of the gas mixture, and the first pressure value of the gas mixture.

A control device according to a tenth aspect includes an abnormal combustion estimation unit that estimates occurrence of abnormal combustion in a cylinder included in an engine based on the compression pressure of gas in the cylinder, the compression temperature of the gas in the cylinder, the hydrogen equivalent ratio of the gas in the cylinder, and the rotation speed of the engine, and a control unit that generates a first control signal for controlling the hydrogen equivalent ratio or timing of igniting the gas in the cylinder when the occurrence of the abnormal combustion is estimated.

A control device according to an eleventh aspect is the control device according to the tenth aspect, in which the compression pressure indicates the pressure of the gas in the cylinder when a piston included in the cylinder is at a top dead center, and the compression temperature indicates the temperature of the gas in the cylinder when the piston included in the cylinder is at the top dead center.

A control device according to a twelfth aspect is the control device according to the tenth or eleventh aspect, in which the abnormal combustion estimation unit includes a temperature estimation unit that estimates the compression temperature based on the temperature of gas in the engine, a reference value determination unit that determines a first reference value, and a determination unit that compares the first reference value and the compression temperature with each other to determine the occurrence of the abnormal combustion of the gas in the cylinder, and the reference value determination unit determines the compression pressure based on the pressure value of the gas in the engine, determines the hydrogen equivalent ratio based on the temperature and pressure value of the gas in the engine and the rotation speed of the engine, and determines the first reference value based on the compression pressure, the hydrogen equivalent ratio, and the rotation speed of the engine.

A control program according to a thirteenth aspect causes an arithmetic device to execute estimating occurrence of abnormal combustion in a cylinder included in an engine based on the compression pressure of gas in the cylinder, the compression temperature of the gas in the cylinder, the hydrogen equivalent ratio of the gas in the cylinder, and the rotation speed of the engine, and generating a first control signal for controlling the hydrogen equivalent ratio or timing of igniting the gas in the cylinder when the occurrence of the abnormal combustion is estimated.

LIST OF REFERENCE SIGNS

1 Storage Medium
110 Cylinder
115 Combustion Chamber
120 Piston
130 Crankshaft
140 Ignition Device
150 Intake Valve
160 Exhaust Valve
170 Sensor
170-1 Rotation Sensor
170-2 Intake Pressure Sensor
170-3 Intake Temperature Sensor
170-4 Cylinder Internal Pressure Sensor
170-5 Exhaust Pressure Sensor
170-6 Exhaust Temperature Sensor
170-7 Combustion Chamber Temperature Sensor
210 Air Inlet
220 Intake Pipe
230 Intake Port
240 Hydrogen Injection Device
260 First Exhaust Pipe
270 Second Exhaust Pipe
280 Exhaust Port
310 Compression Device
320 Exhaust Turbine
330 Shaft
410 First Exhaust Recirculation Pipe
415 First Exhaust Recirculation Valve
420 Branch Pipe
425 Branch Valve
430 Second Exhaust Recirculation Pipe
435 Second Exhaust Recirculation Valve
500 Control Device
520 Arithmetic Device
530 Communication Device
540 Storage Device
550 Abnormal Combustion Estimation Unit
551 Temperature Estimation Unit
552 Reference Value Determination Unit
553 Determination Unit
560 Control Unit
600 Control Program
610 Spontaneous Ignition Temperature Data
910 First Spontaneous Ignition Line
920 Second Spontaneous Ignition Line
930 Combustion Period
1000 Engine
N Rotation Speed of Engine
$T_{comp}$ Compression Temperature
$P_{comp}$ Compression Pressure Value
$\Phi$ Hydrogen Equivalent Ratio

The invention claimed is:

1. An engine comprising:
a cylinder configured to enable combustion of a gas mixture containing hydrogen;
a piston configured to reciprocate in the cylinder;
an ignition device configured to ignite the gas mixture;
a rotation sensor configured to measure a rotation speed of a crankshaft;
an intake temperature sensor configured to measure a temperature of the gas mixture;
an intake pressure sensor configured to measure a first pressure value of the gas mixture; and
a control device configured to:
determine a compression temperature in the cylinder based on the temperature of the gas mixture; and
control, based on a comparison between the compression temperature and a first reference value, a hydrogen equivalent ratio of the hydrogen contained in the gas mixture or a timing of igniting the gas mixture,
wherein the control device includes:
an abnormal combustion estimation unit configured to estimate an occurrence of abnormal combustion of the gas mixture, the occurrence of the abnormal combustion estimated based on the rotation speed, the temperature of the gas mixture, and the first pressure value of the gas mixture, wherein the abnormal combustion estimation unit includes:
a temperature estimation unit configured to estimate the compression temperature in the cylinder based on the temperature of the gas mixture,
a reference value determination unit configured to determine the first reference value based on the rotation speed, the temperature of the gas mixture, and the first pressure value of the gas mixture, and
a determination unit configured to compare the first reference value and the compression temperature with each other to determine the occurrence of the abnormal combustion of the gas mixture; and
a control unit configured to, based on the estimated occurrence of the abnormal combustion, output a first control signal for controlling the hydrogen equivalent ratio of the hydrogen contained in the gas mixture and/or the timing of igniting the gas mixture.

2. The engine according to claim 1, further comprising:
in the cylinder, a combustion chamber temperature sensor configured to measure a temperature of gas, and
wherein:
the temperature estimation unit is configured to estimate an average temperature of the gas in the cylinder in a combustion period in which the gas mixture is combusted based on the temperature measured by the combustion chamber temperature sensor,
the reference value determination unit is configured to determine a second reference value based on the first reference value and a temperature in the cylinder when the piston is at a top dead center when the gas mixture is normally combusted, and
the determination unit is configured to compare the second reference value and the average temperature with each other to determine the occurrence of the abnormal combustion of the gas mixture.

3. The engine according to claim 1, wherein the first control signal is for decreasing the hydrogen equivalent ratio, and the
control unit is configured to, based on the estimated occurrence of the abnormal combustion:
generate a second control signal for increasing an amount of fuel other than the hydrogen in the cylinder according to a decrease in the hydrogen equivalent ratio.

4. The engine according to claim 1, further comprising:
a compression device configured to compress air prior to injection of the hydrogen into the gas mixture, wherein the control device is configured to generate a second control signal for increasing a compression ratio of the air by the compression device based on the rotation speed, the temperature of the gas mixture, and the first pressure value of the gas mixture.

5. The engine according to claim 1, wherein the first reference value is a predetermined value corresponding to the rotation speed, the temperature of the gas mixture, and the first pressure value of the gas mixture.

6. The engine according to claim 5, wherein the predetermined value corresponds to a hydrogen equivalent ratio of the hydrogen contained in the gas mixture at a time of determining the first reference value, and wherein the hydrogen equivalent ratio of the hydrogen contained in the gas mixture at the time of determining the first reference value is based on the temperature of the gas mixture.

7. The engine according to claim 1, wherein the compression temperature is indicative of a temperature of the gas mixture when the piston is at a top dead center position.

8. The engine according to claim 1, wherein the control device is configured to control the hydrogen equivalent ratio of the hydrogen contained in the gas mixture or the timing of igniting the gas mixture based on the compression temperature being greater than the first reference value.

9. The engine according to claim 1, further comprising:
an intake pipe configured to direct air to be mixed with hydrogen to the cylinder;
an exhaust pipe configured to direct a combustion gas away from the cylinder; and
an exhaust recirculation pipe that connects the exhaust pipe to the intake pipe,
wherein the control device is configured to control, based on the compression temperature being greater than the first reference value, an amount of the combustion gas passing through the exhaust recirculation pipe.

10. The engine according to claim 1, wherein the comparison between the compression temperature and the first reference value is indicative of a likelihood of an occurrence of abnormal combustion.

11. An engine comprising:
a cylinder configured to enable combustion of a gas mixture containing hydrogen;
a piston configured to reciprocate in the cylinder;
an ignition device configured to ignite the gas mixture;
a rotation sensor configured to measure a rotation speed of a crankshaft;
an intake temperature sensor configured to measure a temperature of the gas mixture;
an intake pressure sensor configured to measure a first pressure value of the gas mixture;
a cylinder internal pressure sensor configured to measure a second pressure value of gas in the cylinder; and
a control device configured to:
  determine a compression temperature in the cylinder based on the temperature of the gas mixture; and
  control, based on a comparison between the compression temperature and a first reference value, a hydrogen equivalent ratio of the hydrogen contained in the gas mixture or a timing of igniting the gas mixture
wherein the control device includes:
an abnormal combustion estimation unit configured to estimate an occurrence of abnormal combustion of the gas mixture, the occurrence of the abnormal combustion estimated based on the rotation speed, the second pressure value of the gas in the cylinder, and the temperature of the gas mixture, wherein the abnormal combustion estimation unit includes:
  a temperature estimation unit configured to estimate the compression temperature in the cylinder based on the temperature of the gas mixture,
  a reference value determination unit configured to determine the first reference value based on the rotation speed, the temperature of the gas mixture, and the second pressure value of the gas in the cylinder, and
  a determination unit configured to compare the first reference value and the compression temperature with each other to determine the occurrence of the abnormal combustion of the gas mixture; and
a control unit configured to, based on the estimated occurrence of the abnormal combustion, output a first control signal for controlling the hydrogen equivalent ratio of the hydrogen contained in the gas mixture and/or the timing of igniting the gas mixture.

12. The engine according to claim 11, wherein the temperature estimation unit is configured to estimate the compression temperature based on the temperature of the gas mixture and the second pressure value of the gas in the cylinder.

* * * * *